Dec. 10, 1963  R. O. WILEY  3,114,016
WIRING DEVICE FOR CONTROLLING CIRCUIT CONTINUITY
Filed May 26, 1960  3 Sheets-Sheet 1

WITNESSES:
Bernard R. Gieguay
Edward F. Possessky

INVENTOR
Roy O. Wiley
BY
Donald Smith
ATTORNEY

Dec. 10, 1963    R. O. WILEY    3,114,016
WIRING DEVICE FOR CONTROLLING CIRCUIT CONTINUITY
Filed May 26, 1960    3 Sheets-Sheet 2

Dec. 10, 1963   R. O. WILEY   3,114,016
WIRING DEVICE FOR CONTROLLING CIRCUIT CONTINUITY
Filed May 26, 1960   3 Sheets-Sheet 3

3,114,016
WIRING DEVICE FOR CONTROLLING
CIRCUIT CONTINUITY
Roy O. Wiley, Newton, Conn., assignor to The Bryant Electric Company, Bridgeport, Conn., a corporation of Connecticut
Filed May 26, 1960, Ser. No. 31,976
8 Claims. (Cl. 200—67)

The present invention relates to electrical wiring devices and more particularly to wiring devices that can be used for controlling the continuity of an electrical circuit.

To apply selected physical principles in providing an arrangement of physical elements in the form of a wiring device requires consideration of the results to be achieved and of the economic factors which bear upon the cost of providing the arranged elements in assembled and operative relation. For example, if the arrangement is to be formed to control the continuity of an electrical circuit, separable contact portions are, of necessity, included as a part of the arrangement for connection in the electrical circuit to be controlled. Separation or disengagement of the contact portions and, conversely engagement of the contact portions if separated, is accomplished through the exercise of operating forces on means provided for actuating the contact portions. For convenient operation of the arrangement, it is obviously desirable that the magnitude of the operating forces and the distance through which these forces are exercised be minimized, provided the operating character of the arrangement is otherwise acceptable.

There are, of course, numerous parameters which determine the required magnitude of operating forces in controlling the engagement of the contact portions. For example, conventional arrangements require the employment of relatively high pressure in maintaining the contact portions in an engaged relation in order to provide an electrical connection of high integrity which would not be provided with lower engagement pressure, principally because of the effect of the accumulation of impurities and irregularities on the mating surfaces of the contact portions through continued use. With the latter effect being substantially removed, it certainly follows that lower operating forces, as related to the required higher operating forces of conventional arrangements, can be employed, provided other parameters do not interfere with the use of the lower operating forces.

Once the arrangement is provided such that the required magnitude of the operating forces is of reduced value, it is desirable, as previously noted, that the means for transmitting the operating forces to the contact portions take a form such that the reduced operating forces need be exercised only through a relatively small distance. The net effect of providing a combination of physical elements which is arranged to be operable with the exercise of reduced operating forces through a relatively small distance is that a reduced amount of energy is required for operation of the combination.

Of course, the combination, which is to be provided in the form of a wiring device for controlling the continuity of an electrical circuit, as well as one which is to be provided as a wiring device for general purposes, should have its individual elements interrelated such that overall costs of construction are relatively minimized.

The preceding general considerations have been set forth only to provide a fuller perspective of the invention, particularly in conjunction with the more specific and ensuing descriptive matter.

Thus, it is an object of the invention to provide a novel wiring device of improved economic and operating character.

It is another object of the invention to provide a wiring device, of the character described, with actuating means being provided so that reduced forces can be exercised through a reduced distance to effect an improved operation for the device.

It is a further object of the invention to provide a wiring device, of the character thus far described, in which the actuating means include a novel lever arrangement coupled with toggle means to effect the improved operation for the device.

Another object of the invention is to provide a novel wiring device in which the separate and operable elements are related to each other in a manner such that an improved assembly is provided for the device.

Still another object of the invention is to provide a wiring device having an improved assembly, as just described, including unique means for securing a mounting member and separate housing parts of the device in assembled relation.

An additional object of the invention is to provide a wiring device having the noted improved assembly, including novel means for retaining terminal portions in assembled relation with the housing parts of the device.

A further object of the invention is to provide a novel wiring device having actuating means for enabling improved operation of the device with reduced operating forces exercised through a reduced distance and having improved means for securing the operative elements of the device, including the actuating means, in assembled relation so that the device can be economically constructed to provide the noted improved operation.

These and other objects of the invention will become more apparent upon consideration of the following detailed description of an illustrative embodiment of the invention as related to the attached drawings, in which.

With regard to the broad precepts of the invention, a wiring device comprises a plurality of physical elements which can be assembled in operative relation without the use of separate fasteners and through the use of securing means forming a part of the elements themselves. The operative elements can include means for actuating or operating separate contact portions, and the operating means comprises a unique combination of a lever arrangement and toggle means for transmitting operating forces to the contact portions so that the required magnitude of the operating forces is relatively reduced in value and need be exercised only through a limited distance. To illustrate more clearly but not to limit these broad principles of the invention, the detailed description will now be set forth.

Figure 1:
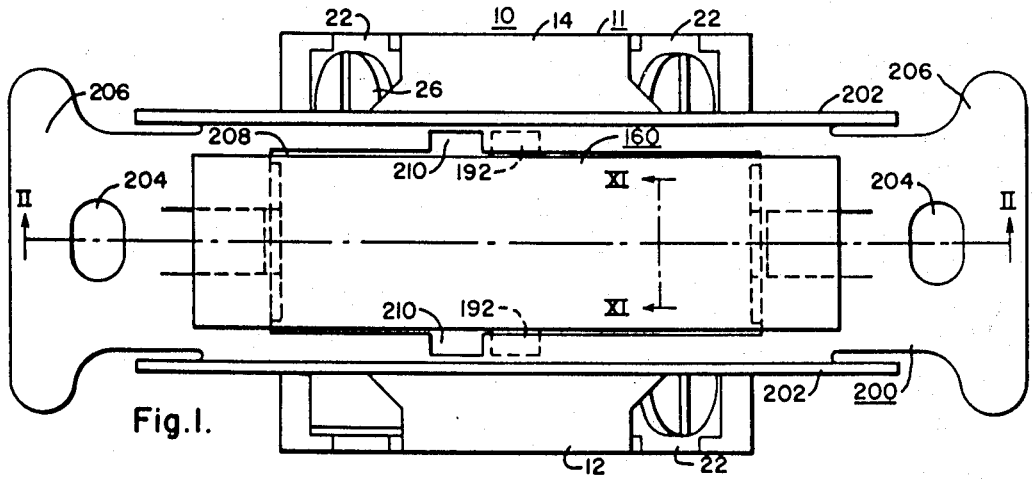
FIGURE 1 is a top plan view of a wiring device constructed in accordance with the principles of the invention for the purpose, in this instance, of controlling the continuity of an electrical circuit.
Figure 2:
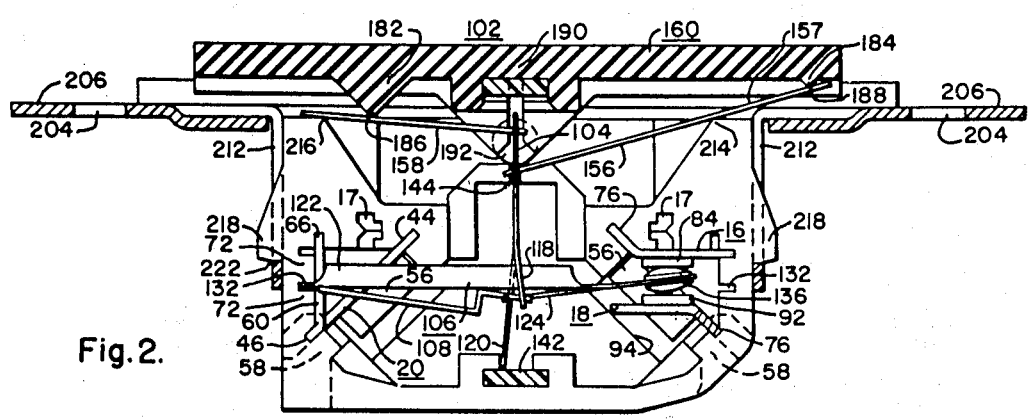
FIG. 2 is a longitudinally sectioned view of the wiring device shown in FIG. 1 taken along the reference line II—II thereof.
Figure 3:
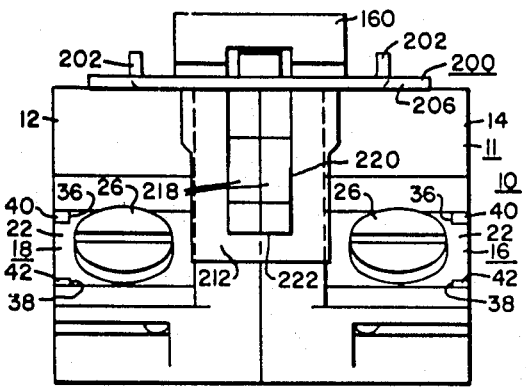
FIG. 3 is an end elevational view of the wiring device shown in FIG. 1.

With reference to FIGS. 1 to 3, a wiring device 10 includes a housing 11 for retaining other operative elements of the invention. In the embodiment of the invention shown here, the housing 11 is comprised of a front part 12 and a rear part 14. The housing parts 12 and 14 are identical to each other, and each is asymmetrical of itself in a manner, and for purposes, to be described hereinafter. When the housing parts 12 and 14 are secured in assembled relation, an interior cavity is provided for positioning the other operative elements of the wiring device 10. A more specific description of the interior structure of the housing 11 will subsequently be undertaken.

Figure 4:
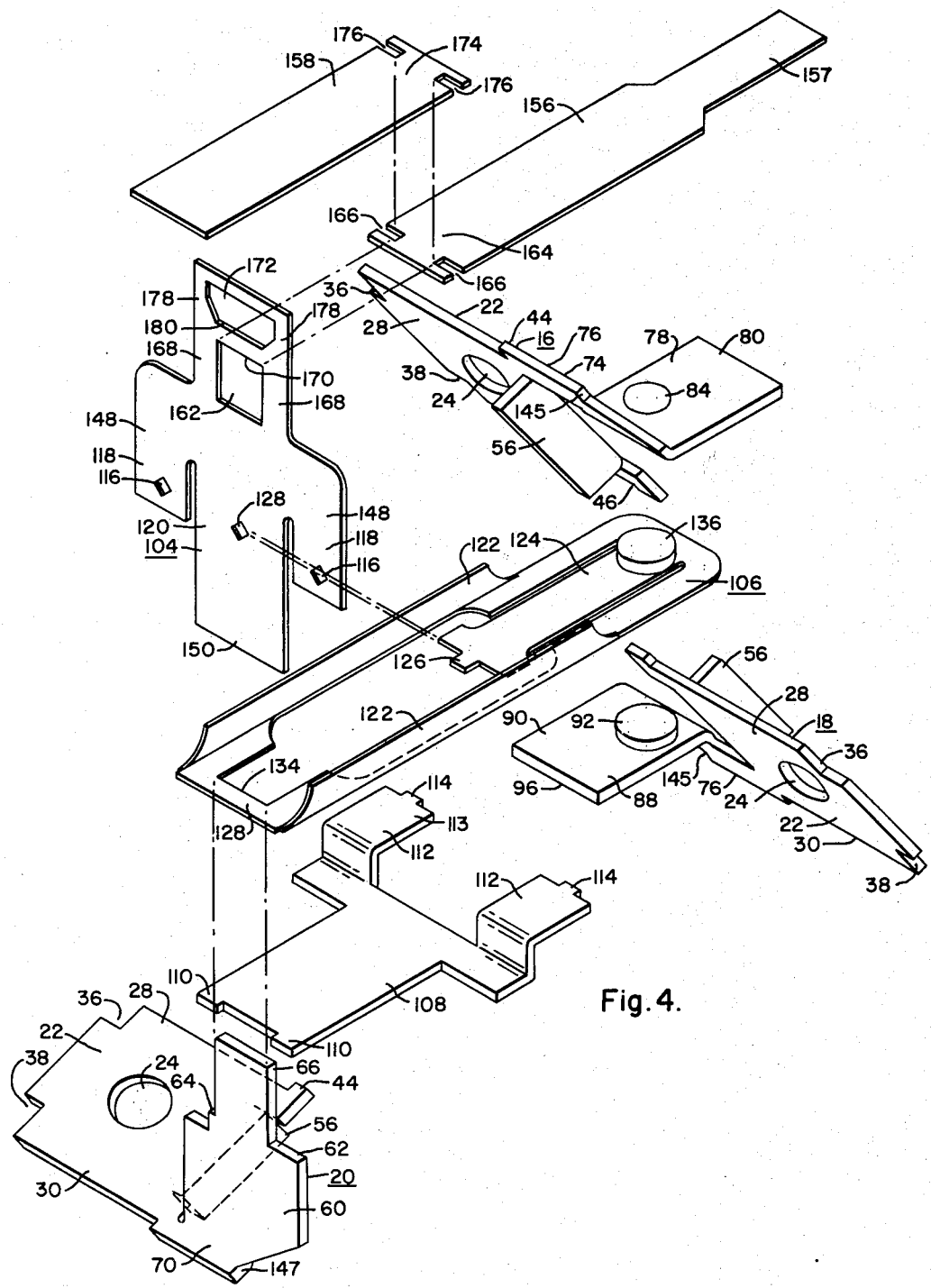
FIG. 4 is an exxploded, enlarged, isometric view of the internal conductive elements of the wiring device which are observed in FIG. 2.

Conductive terminals 16, 18 and 20, with reference to FIGS. 1 and 4, are provided in order to enable the wiring device 10, here in the form of a circuit controller or switch, to be connected in an electrical circuit (not shown). The terminals 16, 18 and 20 are provided with a conductor engaging portion 22 so that the terminals 16, 18 and 20 can be connected, respectively, with an energizing conductor, conventionally in the form of a wire. In this example, the conductor engaging portion 22 is provided with an opening 24 for insertion of a fastener or screw 26 which, when coupled with a nut (not shown), provides for engaging an inserted conductor. To provide lateral strength for the conductor engaging portion 22 of the terminals 16 and 18 and 20, a laterally extended flap 56 is provided.

Figure 5:
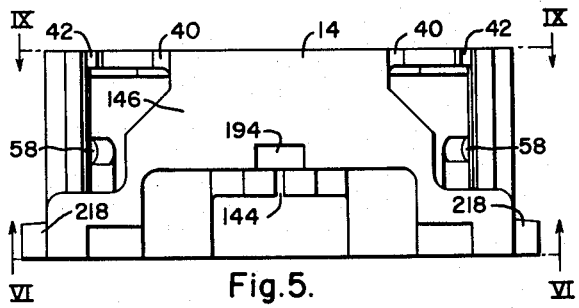
FIG. 5 is a top plan view of one of two identical parts of a housing for the wiring device shown in FIG. 1.

As a first step in the assembly of the wiring device or circuit controller 10, subject to subsequent assembly notations, the terminals 16 and 20 can be assembled with the rear housing part 14. Assembly of the terminal 20 is accomplished by inserting wings 28 and 30 of the conductor engaging portion 22 along housing slots 32 and 34, respectively, as observed in FIG. 6, until notches 36 and 38 of the conductor engaging portion 22 are engaged by projections 40 and 42, respectively, as observed in FIG. 5, of the housing part 14. When the terminal 20 is fully inserted as described, terminal tabs 44 and 46 are also positioned to be engaged by shoulders 48 and 50 provided in the housing slots 32 and 34, respectively, as observed in FIG. 6. The assembled position of the terminal 20 with relation to the housing part 14 is obviously one which stabilizes the terminal 20 against all removal forces except those which would urge withdrawal of the terminal 20 outwardly along the housing slots 32 and 34.

Figure 7:
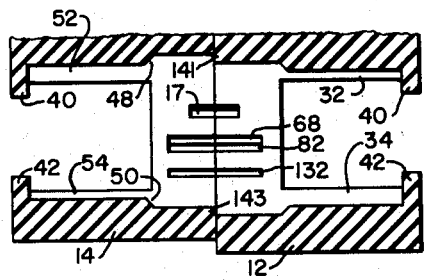
FIG. 7 is a partial sectional view of the wriing device shown in FIG. 1, with the internal conductive elements being removed and taken along the reference line VII—VII of FIG. 6. This view shows how an asymmetry of each of the housing parts provides for retaining inserted terminal elements.
Figure 9:
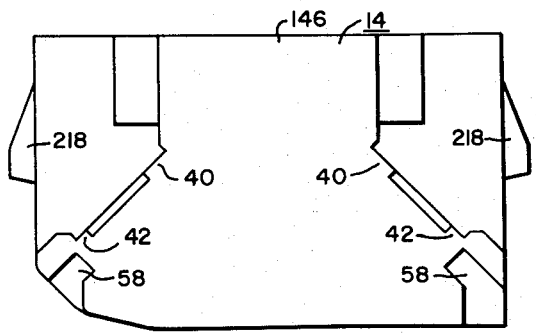
FIG. 9 is a front elevational view of the housing part shown in FIG. 5, taken along the reference line IX—IX thereof.
Figure 8:
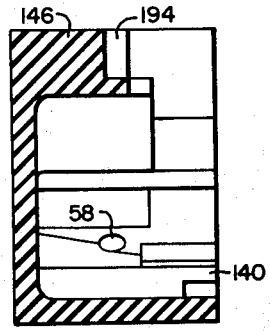
FIG. 8 is a cross-sectional view of the housing part shown in FIG. 6, taken along the reference line VIII—VIII thereof.

The terminal 16 can be readily assembled with the housing part 14 in a manner identical with that just described in connection with the assembly of the terminal 20. Thus, this assembly is accomplished by inserting the wings 28 and 30 of the terminal 16 along the housing slots 52 and 54 until the terminal notches 36 and 38 and the terminal tabs 44 and 46 are engaged by the housing part 14 as described in connection with the engagement of the terminal 20. It is to be noted, however, that although the housing slots 52 and 54 are positioned in a reference plane which is located symmetrically of the housing 11 relative to a reference plane through the slots 32 and 34, the slots 32 and 34 are provided with a lower position along their associated reference plane than are the slots 52 and 54 along their associated reference plane. The resulting asymmetry of the housing part 14, as well as the housing part 12, to which reference has been made previously, can be observed in FIG. 7 which shows a sectional view of the housing parts 12 and 14 when they are placed in assembled relation so that the slots 32 and 34 of the housing part 12, and 52 and 54 of the housing part 14 are positioned in opposed and offset relation. The purpose of the offset relation will be noted subsequently.

Similarly, the terminal 18 can be assembled with the front housing part 12. Thus, the wings 28 and 30 of the terminal 18 can be guided into the housing part 12 along slots (not shown) which correspond to the slots 32 and 34 of the housing part 14. In addition, an insulator (not shown) can be inserted into the housing part 12 along other slots (not shown) which correspond to the slots 52 and 54 of the housing part 14. However, another terminal (not shown) can be inserted in the noted other slots of the housing part 12, with appropriate conductive relations being established relative to the terminals 16, 18 and 20, in the event it is desired to establish a type of circuit control, such as four way operation, which is different from the type of circuit control to be described here as being provided through the use of the terminals 16, 18 and 20.

A wire entrance channel 58, being substantially parallel to the conductor engaging portion 22 of the associated and assembled terminal 16 or 18 or 20 is provided under each terminal 16 or 18 or 20 so that what is conventionally termed "back wiring" can be readily accomplished. For a fuller description of the latter feature, reference can be made to United States Patent 2,917,610, O. L. Taylor, entitled "Wiring Device," issued December 15, 1959, and assigned to the present assignee. Of course, what is conventionally termed "front wiring" can also be readily accomplished in view of the fact that the conductor engaging portion 22 of the terminals 16, 18 and 20 is faced, at an acute angle, here on the order of 45°, from a horizontal plane through the wiring device 10, toward the front of the circuit controller 10.

The terminal 20 is also provided with an upwardly extending conductive arm 60 having shoulders 62 and 64, for purposes to be noted subsequently, and an upper portion 66 which is guided along a slot 68, as observed in FIG. 6, of the housing part 14 during the assembly of the terminal 20. An offset arm section 70, being substantially planar with the conductor engaging portion 22 of the terminal 20, is positioned in the slot 34 of the housing part 14 when the terminal 20 is fully inserted. To limit movement of the terminal arm 60, wall portions 72 of the housing part 14, as observed in FIG. 2, are engaged with the adjacent face of the arm 60 of the fully inserted terminal 20.

Figure 6:
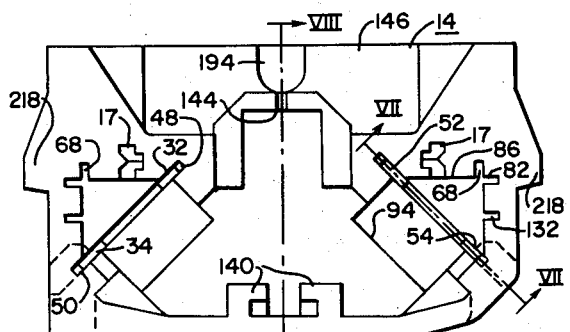
FIG. 6 is a side elevational view of the housing parts shown in FIG. 5 taken along the reference line VI—VI thereof.

To describe further the terminal 16, it is to be noted that it is provided with a contacting arm 74 having an upper section 76 for engagement with the housing part 14 in the slots 52, in the plane of the conductor engaging portion 22, and a forearm portion 78 having an end section 80 for engagement in a slot 82 of the housing part 14, as observed in FIG. 6, and a contact element 84 of a highly conductive material such as silver. To stabilize the forearm portion 78, an overhanging portion 86 of the housing part 14 is provided for engagement, or abutment, therewith.

The terminal 18 is similarly provided with a contacting arm 88 having an upper portion 76 for engagement with the housing part 12 in the adjacent slot corresponding to the slot 34 of the housing part 14, and having a forearm portion 90 with a contact element 92. A supporting section 94 of the housing parts 12 and 14 is provided to engage or adjoin and thereby support an edge 96 of the forearm 90 of the terminal 18. When the housing parts 12 and 14, along with the terminals 16, 18 and 20, are placed in assembled relation, the terminal contact elements 84 and 92 are spaced from each other so that a conductive path can be selectively established through either of the two contact elements 84 or 92.

With particular reference to FIGS. 2 and 4, means for establishing a conductive path between the terminal 20 and either the terminal 16 or the terminal 18 are provided within the housing 11. It is to be realized, however, that although the present arrangement is one which is a "single pole, double throw" circuit controller, or, more conventionally, a three-way circuit controller, modified arrangements can be provided, particularly in the matter of the number and the disposition of the terminal members, to afford single pole or four way or any other desired mode of operation. The means for establishing the noted conductive paths include toggle means 100 to provide stability in the establishment of the conductive paths and actuating means 102 to provide forces for operating the toggle means 100 in establishing either of the two conductive paths.

To provide toggle or stabilizing forces the toggle means 100 include a resilient junction or spring member 104 which is generally constructed to be disposed for operational movement within the housing 11. The toggle means 100 also include a movable contact carrier 106 for engagement with the spring 104 to provide a conductive path to the terminal 16 or the terminal 18 in response to movement of the spring 104. In addition, a strut 108 is provided for cooperation with the spring 104 and the carrier 106 in enabling the toggle means 100 to be operated.

The strut 108 is provided with a pair of laterally spaced tabs 110 at its one end for support upon the shoulders 62 and 64 of the terminal 20 with the terminal portion 66 located therebetween. In addition, each of a pair of laterally spaced arms 112 is provided with an end tab 114, which is extended from a lateral arm portion 113 being vertically offset from the plane of the strut 108, for latching engagement with the spring 104 in respective openings 116 located in respective and laterally spaced spring arms 118. With the strut 108 being supported by the terminal 20 as described, any forces by the strut 108 in response to applied compressive forces will, to a considerable extent, deflect the spring arms 118.

The movable contact carrier 106 is generally rectangular in shape with a portion of its interior removed to allow for its being positioned to circumscribe a central leg 120 of the spring 104. To provide strength against longitudinal bending of the contact carrier 106, a pair of longitudinal ribs 122 are employed. A central carrier arm 124 is provided with an end tab 126 for latching engagement with the spring leg 120 in a leg opening 128. A carrier end section 128 is provided for positioning in a housing slot 132, with the arm 60 of the terminal 20 being extended through the removed portion of the carrier 106 to abut an inner edge 134 of the carrier end section 128. Of course, a positioning of the carrier 106 relative to the terminal 20 as described is to be made prior to assembly of the terminal 20 with the housing part 14.

Adjacent to the other end of the movable contact carrier 106 is a contact element 136, desirably of a highly conductive material such as silver, which is engaged, in this embodiment, with the carrier arm 124. Since the contact element 136 is provided with a contact surface on each of the opposed elongated sides of the arm 124, provision is made for establishing a conductive path between the contact element 136 and either the contact element 84 of the terminal 16 or the contact element 92 of the terminal 18 in response to operative movement of the spring 104, in a manner to be described. Since the carrier end section 128 precludes longitudinal movement of the contact carrier 106 because of the restricting forces of the terminal arm 66, any forces exerted by the carrier leg 124 in response to compressive forces imposed upon it will result, to a considerable extent, in deflection of the spring arm 120.

To provide an assembly of the operative elements of the illustrative embodiment of the invention thus far described, the previously noted first step of the assembly is initially performed, comprising a positioning of the terminal 18, and if desired the aforementioned insulating member, in the front housing part 12 and a positioning of the terminals 16 and 20 in the housing part 14. However, as just noted the contact carrier 106 should be pre-assembled with the terminal 20 so that an assembly of the terminal 20 and the carrier 106 with the housing part 14 is made concurrently.

The spring member 104 can then be inserted through the carrier 106 so that the carrier arm tab 126 is projected through the spring opening 128. The strut 108 is then inserted under the contact carrier 106 and against the terminal 20, as previously described, with the tabs 114 at its opposite end being projected through the spring openings 116. To complete the portion of the assembly now being described, the inner side of the front housing part 12 can be faced against the inner side of the rear housing part 14. As noted previously, the housing parts 12 and 14 are identically constructed, but each is provided with an asymmetry such that, when faced against each other as just described, and as illustrated most clearly in FIG. 7, the slots 32 and 34 of the one housing part are faced against and offset from the slots 52 and 54 of the other housing part. Thus, abutments 141 of the housing part 12 engage terminal portions 145 to retain the terminals 16 and 20 in the housing part 14 against withdrawal through their associated slots and abutment portions 143 of the housing part 14 engage portion, or portions, 147 to retain the terminal 18, and, if desired, the aforementioned insulating member or additional terminal, against withdrawal from the housing part 12 through their associated slots when the housing parts 12 and 14 are faced against each other in engaged relation.

As already noted, the cavity within the housing 11, when the housing parts 12 and 14 are engaged together, is of sufficient size and form to enable the toggle means 100 to be operated. In addition, the housing parts 12 and 14 can be provided with retaining hooks 140 to position stably a buffer 142 of a resilient material such as neoprene, when the housing parts 12 and 14 are engaged as described. The buffer 142 serves to reduce the noise level and to absorb any shock incident to the toggle operation which is to be described subsequently. The spring 104 is positioned within the housing 11 for oscillatory vertical movement relative to the housing 11. To guide the vertical movement of the spring 104, a slot 144 is extended vertically of a wall portion 146 to face the aforementioned cavity in the housing 11. Thus, lateral wing sections 148 of the spring arms 118 are positioned for guided movement in the slots 144. In addition, a lower end section 150 of the spring arm 120 is positioned to be restricted in its vertical movement within the lateral space between the housing hooks 140.

The operation of the toggle means 100 is briefly as follows. Generally, in this embodiment of the invention, the spring 104 is provided with an upper and a lower stable position. Stability of the spring 104 in either of the two noted positions is occasioned through the operation of the aforementioned toggle or stabilizing forces. In any position intermediate to the upper and lower positions of the spring member 104, the carrier arm 124 and the strut 108 are compressed by stabilizing resilient forces imposed by the spring arms 120 and 118, respectively. For clarification, consider a reference plane in which the lateral arm portions 113 of the strut 108 and the carrier 106 are located in a common plane when the spring 104 is located in a given intermediate position to accommodate the relation between the carrier 106 and the strut 108 just indicated.

Incremental movement of the spring 104 to carry the strut 108 and the carrier arm 124 to an angular position above the common reference plane results in accelerating movement of the spring 104 to its upper stable position and resulting angular movement of the carrier 106 so that the carrier contact element 136 is moved to an engaged position with the terminal contact element 92. Similarly, incremental movement of the spring 104 to bring the contact carrier arm 124 in the strut 108 to an angular position below the common reference plane results in accelerated movement of the spring 104 to its lower stable position and movement of the carrier 106 so that the carrier contact element 136 is moved into engaged relation with the terminal contact element 84. In each of the cases just noted, the movement of the spring 104 toward a stable position is occasioned by vertical components of forces exerted by the carrier arm 124 and the strut 108 in response to compressive forces by the spring arms 120 and 118, respectively.

Of course, the upper and lower positions of the spring 104 are stable ones because of the effect of equalizing forces imposed by the stop or buffer 142 in the lower spring position and by a similar stop, to be described subsequently, included in the actuating means 102 in the upper spring position. Since the imparted motion of the carrier 106 is angular relative to the terminal 20, the carrier contact element 136 is provided with a rolling and wiping motion relative to the terminal contact elements 84 and 92 during motion toward and away from the contact elements 84 and 92. This feature prevents the formation of welds, between the carrier contact element 136 and the terminal contact element 84 or 92, which are ordinarily formed to some extent by arcing, and, in other respects, generally maintains clean and free surfaces on the contact elements 84, 92 and 136. For a fuller description of this feature, and for a description of toggle means operating in accordance with general physical principles similar to those for the toggle means 100 but of slightly different structure and with several different operational features, reference can be made to U.S. Patent 2,985,730 of R. O. Wiley, entitled "Switch," filed April 30, 1958 and assigned to the present assignee.

To actuate the toggle means 100, through enforced vertical movement of the spring 104, the actuating means 102 are provided for the circuit controller 10. A mechanical advantage, here in the form of a reduced distance through which operating forces must be exercised, is gained for enforcing the vertical movement of the spring 104 through the employment of lever arms 156 and 158 along with a substantially planar actuator 160. The spring arm 120 is provided with an opening 162 for reception of a latch portion 164 of the lever 156. The lever latch portion 164 includes opposed slots 166 for engagement with lateral sections 168 adjacent the spring opening 162. Thus, when the upper surface of the lever latch portion 164 is positioned to bear against an upper edge 170 of the spring opening 162, forces can be transmitted through the lever 156 to effect an upward movement of the spring 104. It is to be noted that the outer end 157 of the lever 156 is reduced in width to provide for its operative positioning relative to the actuator 160.

Similarly, an opening 172 is provided for reception of a latch portion 174 of the lever arm 158. Slots 176 are provided in the lever latch portion 174 to guide movement of the lever 174 along lateral sections 178 of the spring arm 120. Thus, when the under surface of the lever 158 is positioned to bear against a lower edge 180 of the spring opening 172, forces can be transmitted through the lever 158 to effect a downward movement of the spring 104.

Figure 10:
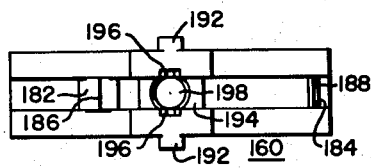
FIG. 10 is a bottom plan view of an actuator which is shown in assembled position in FIG. 1.

The actuator 160 is provided with a pair of spaced, downwardly extended projections 182 and 184 which terminate the apexes 186 and 188, respectively, in order to concentrate operating forces in actuating the levers 158 and 156, respectively. A central portion 190 is also extended downwardly from the actuator 160 to provide a pair of laterally extended projections, or trunnions, 192, as viewed in FIG. 10, for pivotal support of the actuator 160 in notches 194 provided, respectively, in the housing parts 12 and 14. In addition, a slot 194 is extended longitudinally along the under side of the central portion 190 to provide for movement of the levers 156 and 158, and a pair of upstanding grooves 196 are provided transversely of the slot 194 to provide for guided movement of the spring arm 120. At the inner side of the slot 194, a buffer 198, of resilient material, such as neoprene, is provided to reduce any noise and absorb any shock attendant to vertical movement of the spring 104. Of course, the buffer 198 forms a stop for the upward movement of the spring 104 and, therefore, defines the aforenoted upper stable position of the toggle means 100.

Although other means can be employed for securing the operative elements of the present embodiment of the invention in assembled relation, a yoke member 200 is used here to secure the housing parts 12 and 14 and the actuator 160 in assembled relation to enable the toggle means 100 to be operated as described previously. The yoke member 200 is an elongated element and is of sufficient width to cover, in combination with the actuator 160, the upper and open side of the housing 11. Longitudinal rims 202 are extended along each side of the yoke member 200 to provide strength for the yoke member 200 against longitudinal bending. To enable mounting of the circuit controller 10, yoke ears 206 are provided with openings 204 through which any suitable fastener, such as a screw, can be passed for mounting purposes.

A central portion 208 of the yoke 200, generally rectangular in form, is removed to provide for assembly of the actuator 160. In this connection, a pair of laterally opposed slots 210 are provided in the yoke 200 in a position which is offset from the removed portion 208. The slots 210 provide for insertion of the actuator trunnions 192 during assembly of the actuator 160 relative to the yoke 200. In providing for securing the housing parts 12 and 14 in assembled relation, a pair of longitudinally spaced tabs 212 are forced downwardly for ultimate positioning relative to the housing 11 in a manner to be described subsequently.

To complete the assembly of the circuit controller 10, the lever arms 156 and 158 can be engaged with the spring 104 in the manner previously described so that the lever arm 156 is extended to engage or adjoin a pivot section 214 of the housing wall portions 146, and so that the lever arm 158 is extended to engage or adjoin another pivot section 216 of the housing wall portions 146.

The actuator 160 can then be preassembled with the yoke 200 by passing the actuator trunnions 192 through the yoke slots 210 and sliding the actuator 160 toward the transverse centerline of the yoke 200. The preassembled actuator 160 and yoke 200 can then be placed upon the open side of the housing 11 so that the actuator trunnions 192 are positioned in the housing notches 194. Additionally, the actuator projections 182 and 184 are positioned to engage the levers 158 and 156, respectively, and the yoke tabs 210 are placed adjacently to projections 216 extending outwardly from the housing ends which face along the longitudinal axis of the yoke 200.

The yoke tabs 212 are provided with openings 220 for reception of the housing projections 218. Thus, when the tabs 212 are forced against the respectively adjacent ends of the housing 11, the tabs 212 engage the projections 218 through the tab openings 220 to hold the housing parts 12 and 14 in assembled relation, relative to each other, and to hold the yoke 200 and the actuator 160 in assembled relation relative to the housing parts 12 and 14. With the assembly thus completed, the lever arms 156 and 158 and the toggle means 100 are also provided with an assembled yet operative relation relative to the housing 11.

Figure 11:
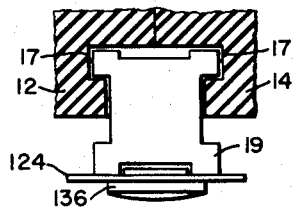
FIG. 11 is a partial sectional view which is taken along the reference line XI—XI of FIG. 1 with one of the internal conductive elements being removed from the device and an insulated member being provided as shown.

With the housing parts 12 and 14 held firmly together, the terminals 16, 18 and 20 are engaged in stable positions because of the aforementioned asymmetry of the housing parts 12 and 14. The circuit controller 10 can be placed in use by attaching a conductor to either or both of the terminals 16 and 18 and to the terminal 20. Thus, when the spring 104 is in its lower stable position so that the carrier contact 136 is engaged with the contact 84 of the terminal 16, a conductive path is established between the terminal 16 and the terminal 20. Similarly, when the spring 104 is in its upper stable position so that the carrier contact 136 is engaged with the contact 92 of the terminal 18, a conductive path is established between the terminal 18 and the terminal 20. However, if desired, a fiber stop 19, as observed in FIG. 11, can be positioned in housing recesses 17 to provide an abutment for limiting movement of the carrier contact 136, thereby enabling the terminal 16 to be omitted so that the device 10 can be provided in single pole form. It is, of course, through the novel mutual assembly of the operative elements in this embodiment of the invention including the terminals 16, 18 and 20 and the housing parts 12 and 14, that the operation of the toggle means 100 and the actuating means 102 is enabled. However, no implication is being made that the use of any one feature of the invention necessitates the use of any other feature of the invention.

To control the establishment of either of the two noted conductive paths, the actuator 160 need be rotated, with the actuator trunnions 192 providing pivotal support, through only a relatively small angle on the order of 3 or 4 degrees. Thus, with reference to FIG. 2, clockwise rotation of the actuator 160 results in the imposition of downward forces, by the actuator projection 184, against the end 157 of the lever 156 to rotate the lever 156 about the housing pivot section 214 as a fulcrum point and to cause upward movement of the spring 104. The limit for the clockwise movement of the actuator 160 is formed by the front face of the yoke 200.

In a similar manner, nominal counterclockwise rotation of the actuator 160 results in the imposition of downward forces, by the actuator projection 182, against the lever 158 to rotate the lever 158 about the housing pivot section 216 as a fulcrum point and thereby to effect downward movement of the spring 104. Counterclockwise movement of the actuator 160 is also limited by the face of the yoke 200.

Since the aforementioned rolling and wiping movement of the carrier contact 136 maintains clean contact surfaces which are free of welds, the magnitude of force necessary for establishing a good connection between the carrier contact 136 and the terminal contact 84 or 92 can be readily provided with lower values without impairing circuit conductivity. However, the rolling and wiping feature is not conditionally precedent to the use of other features of the invention.

As a corollary, reduced forces can be employed for actuation of the spring 104, and, in conjunction with the advantage gained through the use of the levers 156 and 158, the total energy required for operating the toggle means 100 through the actuator 160 is of considerably reduced value. As previously indicated, the operating forces imposed upon the actuator 160 need only be exercised through a relatively small distance.

In the foregoing description, the mode of operation of an arrangement of specified elements has been related to point out the principles of the invention. The description, therefore, has only been illustrative of the invention, and, accordingly, it is desired that the invention be not limited by the arrangement or embodiment described here but, rather, that it be accorded an interpretation consistent with the scope and spirit of its broad principles.

What is claimed is:

1. A wiring device comprising an elongated housing having two identical parts, each of the housing parts having a pair of opposed slots adjacent each of its opposite ends and extended inwardly from one side thereof, the pairs of slots of each housing part asymmetrically located relative to a reference plane located centrally and transversely of their housing part, toggle means supported in said housing and having a contact portion for controlling the continuity of an electrical circuit, a terminal member having a contact portion engageable by said first mentioned contact portion located in at least one of said pairs of slots of one of the housing parts and retained therein by a portion of said one side of the other of the housing parts, means for securing the housing parts together, and lever means positioned in said housing and engaging said toggle means, said lever means being pivotable to effect an operation of said toggle means in controlling the continuity of said circuit.

2. A wiring device comprising an elongated two part housing, at least a pair of terminal members supported within said housing, means for making and breaking a circuit between said terminal members, and an elongated yoke member positioned against one side of each of the parts of said housing, said yoke member having a projection adjacent each of its opposite ends, said yoke projections extended substantially transversely from said yoke and having an opening therein, respectively, for latching engagement with cooperative projections extended outwardly from each end of each of the housing parts so that said wiring device can be secured in assembled relation.

3. A wiring device comprising an elongated housing having two identical parts, each of the housing parts having a pair of opposed slots adjacent each of its opposite ends and extended inwardly from one side thereof, the pairs of slots of each housing part asymmetrically located relative to a reference plane located centrally and transversely of their housing part, at least two terminal members positioned respectively in said pairs of slots, means for making and breaking a circuit between said terminal members, and means for securing the housing parts together so that said terminal members are retained in their slots by respective portions of the one side of the opposing one of the housing parts.

4. A wiring device comprising an insulating base, a toggle system including a junction member being supported for overcenter movement between an open and a closed circuit condition on said base, said toggle system also having a contact bearing toggle arm for controlling the continuity of an electrical circuit through stationary contact means mounted on said base, first and second lever members pivotally supported on said base and engaging said junction member, said first lever member being pivotable to actuate said junction member overcenter in one direction to effect one of the open and closed circuit conditions, said second lever member being pivotable to actuate said junction member overcenter in the opposite direction to effect the other of the open and closed circuit conditions.

5. A wiring device comprising an insulating base, at least one terminal mounted on said base and having one contact portion, a toggle arrangement including a junction member positioned for overcenter movement on said base, said toggle arrangement having a movable arm bearing another contact portion movable between relations of engagement and disengagement with said one contact portion, another terminal mounted on said base and being electrically common with said toggle movable arm, first and second lever members pivotally supported on said base and engaging said junction member, said first lever member being pivotable to actuate said junction member overcenter in one direction to effect one of the engaged and disengaged contact portion relations, said second lever member being pivotable to actuate said junction member overcenter in the opposite direction to effect the other of the engaged and disengaged contact portion relations, and an actuating member supported pivotally on said base to actuate said first and said second lever members.

6. A wiring device comprising an insulating base, toggle means for making and breaking an electrical circuit mounted on said base, first and second elongated lever members supported generally in end to end relation on said base and having the respective inner ends thereof engaging an actuating portion of said toggle means, each of said first and second levers having a pivot portion adjoining respective pivot portions of said base, and means for pivotally actuating one of said first and second lever members at a point intermediate its pivot portion and its inner end and for actuating the other of said first and second lever members at a point intermediate its pivot portion and its outer end so that said toggle means can be directly operated by the respective lever members to make and break said circuit.

7. A wiring device comprising an insulating base, means for controlling the continuity of an associated electrical circuit comprising a toggle arrangement including an upstanding junction spring member mounted on said base, first and second elongated lever members supported generally in end to end relation on said base and having their inner ends engaging an upper portion of said spring member, each of said first and said second levers having a pivot portion adjoining respective pivot portions of said base, and means for pivotally actuating one of said first and second lever members at a point intermediate to its pivot portion and its inner end and for actuating the other of said first and second lever members at a point intermediate to its pivot portion and its outer end so that said spring member can be operated in either an upward or a downward direction to effect overcenter movement of said toggle arrangement and thereby control the continuity of an associated electrical circuit.

8. A wiring device comprising an insulating base, toggle means for making and breaking an electrical circuit mounted on said base, first and second elongated lever members supported generally in end to end relation on said base and having their inner ends engaging an actuating portion of said making and breaking means, each of said first and said second levers having a pivot portion adjoining respective pivot portions of said base, an elongated actuating member pivotally supported against longitudinal movement on said base to enable actuation of said first and said second lever members, a yoke member extending over said base and having an opening to provide access for operating said actuating member, and means for securing said yoke member to said base so that said actuating member is retained in its pivotal position, said actuating member being engageable with one of said first and second lever members at a point intermediate to its pivot portion and its inner end and being engageable with the other of said first and second lever members at a point intermediate to its pivot portion and its outer end so that said making and breaking means can be operated either to make or to break said circuit.

References Cited in the file of this patent
UNITED STATES PATENTS

| | | |
|---|---|---|
| 1,385,296 | Anderson | July 19, 1921 |
| 1,502,785 | Kerwin | July 29, 1924 |
| 1,939,052 | Hubbell | Dec. 12, 1933 |
| 2,024,273 | Butler | Dec. 17, 1935 |
| 2,199,357 | Dillman | Apr. 30, 1940 |
| 2,277,555 | Meuer | Mar. 24, 1942 |
| 2,486,033 | Kaminky | Oct. 25, 1949 |
| 2,625,630 | Eckles | Jan. 13, 1953 |
| 2,697,145 | Winet | Dec. 14, 1954 |
| 2,716,682 | Franklin | Aug. 30, 1955 |
| 2,874,338 | Pease | Feb. 17, 1959 |
| 2,954,447 | Bolesky | Sept. 27, 1960 |